US008482803B2

(12) United States Patent
Wang et al.

(10) Patent No.: US 8,482,803 B2
(45) Date of Patent: Jul. 9, 2013

(54) SYSTEM AND METHOD FOR HALFTONING USING A PARAMETRICALLY CONTROLLED HEXAGONAL HALFTONE DOT SHAPE THRESHOLD FUNCTION

(75) Inventors: Shen-Ge Wang, Fairport, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 721 days.

(21) Appl. No.: 12/647,652

(22) Filed: Dec. 28, 2009

(65) Prior Publication Data

US 2011/0157654 A1    Jun. 30, 2011

(51) Int. Cl.
*G06K 15/00* (2006.01)
(52) U.S. Cl.
USPC ........... 358/3.2; 358/3.11; 358/3.09; 358/306
(58) Field of Classification Search
None
See application file for complete search history.

(56) References Cited

U.S. PATENT DOCUMENTS

| 4,149,183 A | 4/1979 | Pellar et al. |
|---|---|---|
| 4,196,451 A | 4/1980 | Pellar |
| 5,381,247 A | 1/1995 | Hains |
| 5,526,445 A | 6/1996 | Smutek et al. |
| 6,798,539 B1 | 9/2004 | Wang et al. |
| 7,310,168 B2 | 12/2007 | Trelewicz et al. |
| 2006/0170975 A1* | 8/2006 | Wang ........................... 358/3.06 |
| 2006/0279787 A1 | 12/2006 | Li et al. |
| 2008/0130054 A1 | 6/2008 | Wang et al. |
| 2008/0130055 A1 | 6/2008 | Wang et al. |

OTHER PUBLICATIONS

Wang, et al. Nonorthogonal Halftone Screens, IS&T's NIP18: 2002 International Conference on Digital Printing Technologies, pp. 578-584.

* cited by examiner

*Primary Examiner* — Twyler Haskins
*Assistant Examiner* — Christopher D Wait
(74) *Attorney, Agent, or Firm* — Fay Sharpe LLP

(57) ABSTRACT

Methods and apparatuses for halftoning an image are provided using a parametrically controlled hexagonal halftone dot shape threshold function that reduces tone reproduction irregularities in the halftoned image which can occur at darker gray levels. The halftoning transforms image data representing contone image pixels into halftoned image data in the form of clustered-dot hexagonal halftone screens for representing halftone dots of a halftoned image. Weight parameters can be used to control the rate at which a respective vertex of a halftone dot approaches a vertex of a neighboring halftone dot in relation to gray level. The hexagonal halftone dot shape threshold function can also control the shape of the sides of the halftone dots.

23 Claims, 15 Drawing Sheets

SYSTEM AND METHOD FOR HALFTONING USING A PARAMETRICALLY CONTROLLED HEXAGONAL HALFTONE DOT SHAPE THRESHOLD FUNCTION

BACKGROUND

The presently disclosed embodiments are directed toward methods and systems for printing, reproducing or displaying images. More particularly, the teachings disclosed herein are applicable to methods and apparatuses wherein clustered-dot halftoning is implemented.

Digital images may be formatted as contone (continuous tone) images having a wide range of tonal values or may be formatted as coarsely quantized images having a limited number of tonal values, such as two levels for a binary image. Digital halftoning is a process of transforming a contone image to a coarsely quantized image. Digital halftoning is an important step in printing or displaying digital images possessing contone color tones because most printing processes are operating in a binary mode. Examples of such marking processes are offset printing presses, xerography, and ink-jet printing. In these processes, for each color separation of an image, a corresponding colorant spot is either printed or not printed at any specified image location, or pixel. Digital halftoning controls the printing of color dots formed by combinations of colorant spots of a colorant set, where the spatial averaging of the printed colorant dots, such as by the human visual system, provides the illusion of the required continuous tones.

Digital images and the resulting prints are formed of one or more colorant separations, also referred to as "color separations." A monochrome image is formed of one colorant separation, typically black. Process color images are typically constructed of cyan, magenta, yellow, and black separations. Duotone and tritone images, are formed of two and three separations, respectively. Spot color images have multiple colorant separations, where at least one colorant is positioned spatially nonoverlapping with other colorants. Extended colorant set images typically include the process-color colorant separations plus one or more additional colorant separations such as green, orange, violet, red, blue, white, varnish, light cyan, light magenta, gray, dark yellow, metallics, and so forth. In the present teachings, we use the terms "color images", "color dots", "color spots", "colorant" and similar language to refer to images and marking systems with any number of colorants. The teachings herein apply particularly to any individual color separation of a digital image and resulting print, where that digital image or print can be composed of one or more separations. With the advent of computers, it is desirable for graphic artists and others to manipulate contone images and print them as halftone images. However, typical computer printers and typesetters are incapable of printing individual halftone dots in an infinite number of sizes. Instead, each halftone dot of a printed picture is in turn comprised of a collection of discrete, smaller "spots" or "pixels", which are generally the smallest marks a printer or typesetter can make.

FIG. 1 illustrates how one such dot may be made up of individual pixels. A grid 100 is comprised of a set of 100 contiguous pixels, and therefore, is capable of representing 101 shades, or levels, of gray from totally light and white (0% gray level and no pixels darkened) to totally dark and black (100% gray level and all pixels darkened). For every 1% increase in darkness, one pixel in the set will be darkened, or turned on for printing. For example, at 1% gray, a single pixel 1 is darkened. At 2% gray, pixel 2 is darkened as well, so that the dot is comprised of two pixels. At 10% gray, ten pixels 1-10 are darkened. Pixels are either dark and thus printed, or not dark and not printed, and are not individually capable of representing shades of gray.

A common halftone technique is called screening, which compares the required continuous color tone level of each pixel for each color separation with one or more predetermined threshold levels. The predetermined threshold levels are typically defined for halftone cells that are tiled to fill the plane of an image, thereby forming a halftone screen of threshold values. At a given pixel, if the required color tone level is greater than the halftone threshold level for that pixel, a "1" is generated in the halftone output, so that a colorant spot is printed at that specified pixel in the subsequent printing operation. If the required color tone at a given pixel is less than the halftone threshold level for that pixel, a "0" is generated in the halftone output, so that a colorant spot is not printed at that specified pixel in the subsequent printing operation. The output of the screening process is a binary pattern that controls the printing of multiple small spots or pixels that are printed. The printed spots can be grouped or "clustered" to form print structures that are relatively stable for a given printing process. We refer to these clusters as "clustered-dots" or "dots", and they are regularly spaced as determined by the size, shape, and tiling of the halftone cell. Conventional periodic halftone screens and halftone screen outputs can be considered as two-dimensional repeated patterns, possessing two fundamental spatial frequencies, which are completely defined by the geometry of the halftone screens.

When halftoning using screening, rather than darkening a random pixel in a cell for every increase in gray level, it is preferable for the pixels to be darkened in a specific order pursuant to a dot shape function, also known as a dot function or spot function. The order of darkening pixels in FIG. 1 reflects a dot shape function which attempts to maintain a generally compact shape for the dot as it increases in size to represent increasing gray levels. Topological curves (labeled from 10% to 100% in increments of 10%) generally define the outline of the dot as it increases in gray level. At 10% gray, the darkened pixels substantially conform with the 10% curve, and form a nearly circular dot around the center 110 of the dot shape function. At 20% gray, the darkened pixels form a slightly larger dot which substantially conforms with the 20% curve. At 50% gray, the pixels form a dot which is in substantially the shape of a diamond. The diamond shape in this example is an attempt to control the way in which neighboring dots touch. The gray level of printed dots tends to be printed with a more consistent darkness if the dot touch points are optimized for the given marking process. It is common to optimize the touch points by shaping the dots to touch at corners rather than boundaries of circles or other shapes, but certain marking processes may require other shape optimization, such as straight side touching or curved boundary touching. At 90% gray, nearly all of the pixels are darkened except for 10 pixels 91-100, these pixels being evenly dispersed at the four corners of the dot.

It is often desirable to store the pixels' representation of the dot shape function in memory for later use. To do so, the dot shape function is evaluated at the location of each pixel in the cell, the pixels are rank ordered according to their respective dot shape function values, and a threshold value from 0% to 100% is assigned to each pixel according to its rank. The values are often stored in bit form, such as 0 to 255 for an 8 bit system. Where dot shape function values are identical or nearly identical (within roughly 10%) for multiple pixels in a dot, their order can be determined by any of a number of secondary considerations. For, instance a marking process or imager may mark pixels in a more consistent manner if pixels are preferentially added to a side, such as the lead edge, or trail edge of the dot as it moves through the process or start-of-scan or end-of-scan aide of a dot relative to a laser imager scanning direction. Angular considerations are sometimes used to rank pixels. For instance, to have minimal displacement of the centroid of the dot from gray level to gray level, pixels with nearly identical dot shape function values are sometimes selected by spiraling around the dot in quadrant steps. As another example, printed dot consistency is sometimes achieved by preferentially growing a dot in a vertical or horizontal direction where pixels having nearly identical dot shape function values are ranked to provide more growth in the preferred direction. In some cases, the fill order for pixels of nearly identical dot shape function values could be random, or selected by any of a number of other criteria. In this way, each pixel has an associated "threshold value" in the halftone screen which is equal to the gray level at which that pixel is darkened in the printed image.

Referring to FIG. 2, if a dot which represents a gray level of 75% is desired, the dot is created by darkening every pixel with a threshold value of 75% or less. A 75% gray-level dot is indicated by outline 200. A single collection of pixels with threshold values representing a dot shape function can be referred to as a "halftone cell" or "cell." As used herein, a cell is a quantized representation of a dot shape function, and for a given cell, the threshold values of the pixels within the cell map the dot shape function.

In this manner, the "digital screen" is created, as an array of cells with pixels having threshold values. Each pixel has a set position and a set threshold value within the cell. Likewise, each cell has a set position within the digital screen. To create a halftone image, a contone image is broken down into an array of pixel-sized samples, and the gray level of each contone sample is stored. Next, each contone sample is compared with the halftone threshold value of the corresponding pixel in the halftone screen, and the pixel is darkened in the subsequent print image if the gray level of the contone sample is greater than the threshold value for that pixel. All the pixels of the digital screen are at set positions with respect to one another, such that a contone sample from the "top-left" of the picture would be compared with a pixel at the "top-left" of the digital screen. In other words, each digital screen pixel has a position which corresponds with and is associated with a position on the original contone picture.

FIG. 3 illustrates a portion of a halftone image 300 represented by dots 310. FIG. 3 was created by comparing an input image having a spatially consistent 5% gray value to a digital screen containing a 3-by-3 array of cells. Each cell contained 100 pixels, and only the pixels with threshold values of 5% or less were darkened and printed. Accordingly, a 3-by-3 array of dots was created, each dot having five pixels. FIG. 4 was created by comparing an input image having a spatially consistent 95% gray value to the same digital screen. All the pixels with gray values of 95% or less were darkened and printed to form a halftone image 400. Although the resulting halftone image 400 is really comprised of nine large dots 410, the naked eye perceives the halftone image as being smaller white dots 420 on a field of black. The white dots are groups of the pixels that are formed from halftone screen values having high thresholds. The white dots can be formed from one or more cells.

Halftoning attempts to render images to printable form while avoiding unwanted visual texture, known as moiré, and tone reproduction irregularities. The two key aspects of halftone screen design are the geometry of periodic dot placement and the shape of the halftone dots. Controlling halftone dot shape has been a lower priority in laser printers because printer pixel resolution, typically measured in rasters per inch referring to the number of smallest printable spots per unit length, has been too low. Consider, for example, the task of controlling dot shape of a 212 cell per inch (cpi) halftone screen used with a printer having a resolution of 600 rasters/inch, where the halftone cell is only two rasters in height. As laser printing resolutions reach 2400 rasters/inch, and greater, controlling halftone dot shape provides a greater impact in improving a printed image.

Hexagonal halftones have been used for process-color printing to avoid moiré that can occur with conventional halftone geometries. In particular, hexagonal dot geometries have been used to reduce moiré between yellow screens and cyan or magenta screens at conventional angles, such as taught by U.S. Pat. No. 5,381,247 for "Method for Reducing 2-Color Moiré in 4-Color Printing" to C. Hains, which is hereby incorporated by reference herein in its entirety. However, this method has not been widely adopted since it can create a tone reproduction irregularity, or "bump", that occurs as the sides of the hexagonal dots grow toward each other when producing darker gray levels in the halftoned image. It is desirable solve this problem with tone reproduction irregularities when using hexagonal halftones to make better use of their advantages as taught by US Publication No. 2008/0130055 for "Moiré-Free Color Halftone Configuration Employing Common Frequency Vectors" to Wang, et al., US Publication No. 2008/0130054 for "N-Color Printing with Hexagonal Rosettes" to Wang, et al., and U.S. Pat. No. 6,798,539 for "Method for Moiré-Free Color Halftoning Using Non-Orthogonal Cluster Screens" to Wang, et al. which are hereby incorporated by reference herein in their entirety.

BRIEF DESCRIPTION

Methods and apparatuses for halftoning an image are provided using a parametrically controlled hexagonal halftone dot shape threshold function data in the form of clustered-dot hexagonal halftone screens.

The method includes receiving contone image data including pixel values representing gray-scale color densities and pixel location information; and halftoning the image using an image processor generating clustered-dot halftone screen output representing halftone dots by comparing the image pixel values to a threshold function in the form of a parametrically controlled hexagonal dot shape function.

In examples of the method of halftoning disclosed herein, the parametrically controlled hexagonal dot shape function is $$Q_1 = a_1 \cos(\pi(2h_1/H_1)) + a_2 \cos(\pi(2h_2/H_2)) + a_3 \cos(\pi(2h_3/H_3))$$

where $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a respective one of the parallel lines from each set, and $a_1$ $a_2$ and $a_3$ are weight parameters controlling the rate at which a respective vertex of a halftone dot approaches a vertex of a neighboring halftone dot in relation to gray level, the halftone dots being substantially circular in halftoned image highlights having lower gray levels, substantially hexagonal in halftoned image midtones, and having triangular holes between adjacent dots in halftoned image shadows having higher gray levels.

In other examples of the method of halftoning disclosed herein, the parametrically controlled hexagonal dot shape function is $$Q_2 = a_1 \cos(\pi(2h_1/H_1)^{\gamma 1}) + a_2 \cos(\pi(2h_2/H_2)^{\gamma 2}) + a_3 \cos(\pi(2h_3/H_3)^{\gamma 3})$$

where $\gamma_i$ controls the shape of the sides of the halftone dots, $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a closest respective one of the parallel lines from each set, and $a_1$ $a_2$ and $a_3$ are weight parameters controlling the rate at which a respective vertex of a halftone dot approaches a vertex of a neighboring halftone dot in relation to gray level, the halftone dots being substantially circular in halftoned image highlights having lower gray levels, substantially hexagonal in halftoned image midtones, and having triangular holes between adjacent dots in halftoned image shadows having higher gray levels.

In other examples of the method of halftoning disclosed herein, the parametrically controlled hexagonal dot shape function is $$Q_3 = (a_1 + a_2 + a_3) - (a_1 \cos(\pi(2h_1/H_1)^{\gamma 1}) + a_2 \cos(\pi(2h_2/H_2)^{\gamma 2}) + a_3 \cos(\pi(2h_3/H_3)^{\gamma 3}))$$

where $\gamma_i$ controls the shape of the sides of the halftone dots, $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a closest respective one of the parallel lines from each set, and $a_1$ $a_2$ and $a_3$ are weight parameters controlling the rate at which a respective vertex of a halftone dot approaches a vertex of a neighboring halftone dot in relation to gray level, providing a compact growth sequence from dark triangles at lower gray levels, to dark hexagons as midtones, to light round holes between adjacent dots in the darker or higher gray levels.

An image halftoner is provided which includes an image processor receiving contone image data including pixel values representing gray-scale color densities and pixel location information, the image processor generating clustered-dot halftone screen output of halftone dots by comparing the image pixel values to a threshold function in the form of a parametrically controlled hexagonal dot shape function.

In examples of the image halftoner disclosed herein, the parametrically controlled hexagonal dot shape function is $$Q_1 = a_1 \cos(\pi(2h_1/H_1)) + a_2 \cos(\pi(2h_2/H_2)) + a_3 \cos(\pi(2h_3/H_3))$$

where $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a respective one of the parallel lines from each set, and $a_1$ $a_2$ and $a_3$ are weight parameters controlling the rate at which a respective vertex of a halftone dot approaches a vertex of a neighboring halftone dot in relation to gray level, the halftone dots being substantially circular in halftoned image highlights having lower gray levels, substantially hexagonal in halftoned image midtones, and having triangular holes between adjacent dots in halftoned image shadows having higher gray levels.

In other examples of the image halftoner disclosed herein, the parametrically controlled hexagonal dot shape function is $$Q_2 = a_1 \cos(\pi(2h_1/H_1)^{\gamma 1}) + a_2 \cos(\pi(2h_2/H_2)^{\gamma 2}) + a_3 \cos(\pi(2h_3/H_3)^{\gamma 3})$$

where $\gamma_i$ controls the shape of the sides of the halftone dots, $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a closest respective one of the parallel lines from each set, and $a_1$ $a_2$ and $a_3$ are weight parameters controlling the rate at which a respective vertex of a halftone dot approaches a vertex of a neighboring halftone dot in relation to gray level, providing a compact growth sequence from dark triangles at lower gray levels, to dark hexagons as midtones, to light round holes between adjacent dots in the darker or higher gray levels.

In other examples of the image halftoner disclosed herein, the parametrically controlled hexagonal dot shape function is $$Q_3 = (a_1 + a_2 + a_3) - (a_1 \cos(\pi(2h_1/H_1)^{\gamma 1}) + a_2 \cos(\pi(2h_2/H_2)^{\gamma 2}) + a_3 \cos(\pi(2h_3/H_3)^{\gamma 3}))$$

where $\gamma_i$ controls the shape of the sides of the halftone dots, $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a closest respective one of the parallel lines from each set, and $a_1$ $a_2$ and $a_3$ are weight parameters controlling the rate at which a respective vertex of a halftone dot approaches a vertex of a neighboring halftone dot in relation to gray level, providing a compact growth sequence from dark triangles at lower gray levels, to dark hexagons as midtones, to light round holes between adjacent dots in the darker or higher gray levels.

A printing device is provided which includes an image processor receiving contone image data including pixel values representing gray-scale color densities and pixel location information, the image processor generating clustered-dot halftone screen output of halftone dots by comparing the image pixel values to a threshold function in the form of a parametrically controlled hexagonal dot shape function.

In other examples of the printing device disclosed herein, the parametrically controlled hexagonal dot shape function is $$Q_1 = a_1 \cos(\pi(2h_1/H_1)) + a_2 \cos(\pi(2h_2/H_2)) + a_3 \cos(\pi(2h_3/H_3))$$

where $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a respective one of the parallel lines from each set, and $a_1$ $a_2$ and $a_3$ are weight parameters controlling the rate at which a respective vertex of a halftone dot approaches a vertex of a neighboring halftone dot in relation to gray level, the halftone dots being substantially circular in halftoned image highlights having lower gray levels, substantially hexagonal in halftoned image midtones, and having triangular holes between adjacent dots in halftoned image shadows having higher gray levels; and a print engine rendering a halftoned image by printing halftone dots having pixels darkened in accordance with their threshold values to represent the appropriate gray scale level of the contone image.

In other examples of the printing device disclosed herein, the parametrically controlled hexagonal dot shape function is $$Q_2 = a_1 \cos(\pi(2h_1/H_1)^{\gamma 1}) + a_2 \cos(\pi(2h_2/H_2)^{\gamma 2}) + a_3 \cos(\pi(2h_3/H_3)^{\gamma 3})$$

where $\gamma_i$ controls the shape of the sides of the halftone dots, $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a closest respective one of the parallel lines from each set, and $a_1$ $a_2$ and $a_3$ are weight parameters controlling the rate at which a respective vertex of a halftone dot approaches a vertex of a neighboring halftone dot in relation to gray level, the halftone dots being substantially circular in halftoned image highlights having lower gray levels, substantially hexagonal in halftoned image midtones, and having triangular holes between adjacent dots in halftoned image shadows having higher gray levels.

In other examples of the printing device disclosed herein, the parametrically controlled hexagonal dot shape function is $$Q_3 = (a_1 + a_2 + a_3) - (a_1 \cos(\pi(2h_1/H_1)^{\gamma 1}) + a_2 \cos(\pi(2h_2/H_2)^{\gamma 2}) + a_3 \cos(\pi(2h_3/H_3)^{\gamma 3}))$$

where $\gamma_i$ controls the shape of the sides of the halftone dots, $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a closest respective one of the parallel lines from each set, and $a_1$ $a_2$ and $a_3$ are weight parameters controlling the rate at which a respective vertex of a halftone dot approaches a vertex of a neighboring halftone dot in relation to gray level, providing a compact growth sequence from dark triangles at lower gray levels, to dark hexagons as midtones, to light round holes between adjacent dots in the darker or higher gray levels.

DETAILED DESCRIPTION

Figure 1:
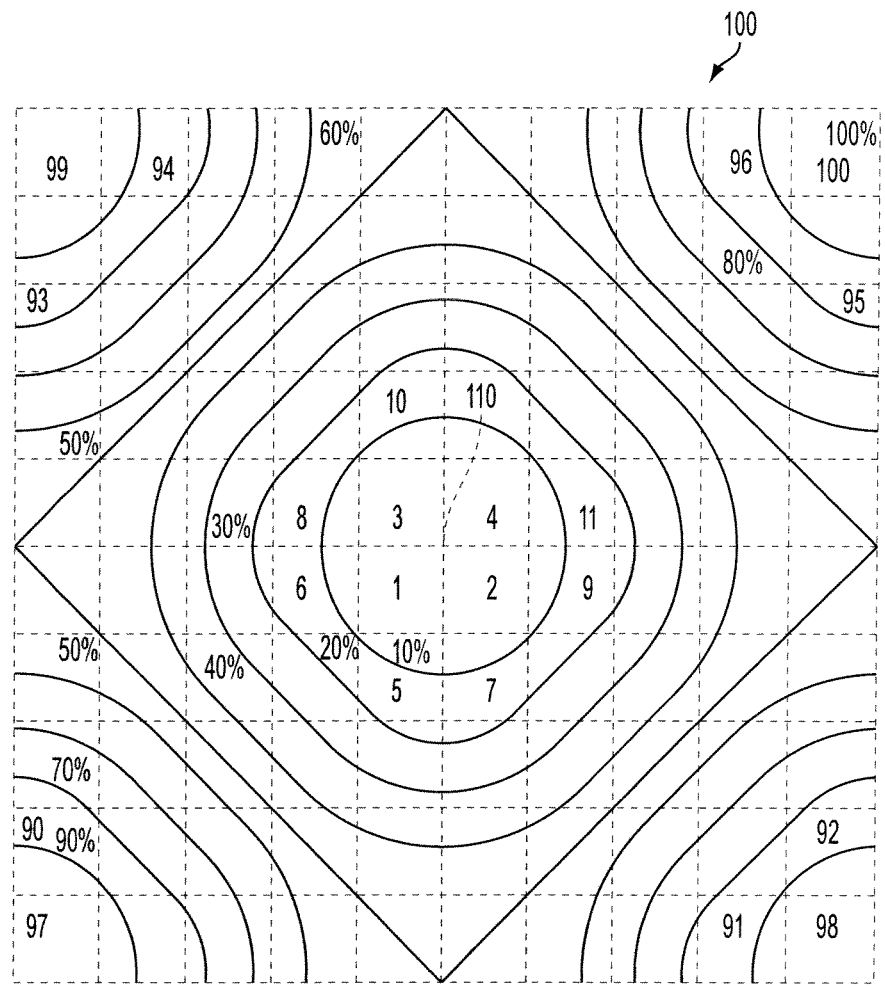
FIG. 1 is a representation of a dot shape function in a halftone cell.
Figure 2:
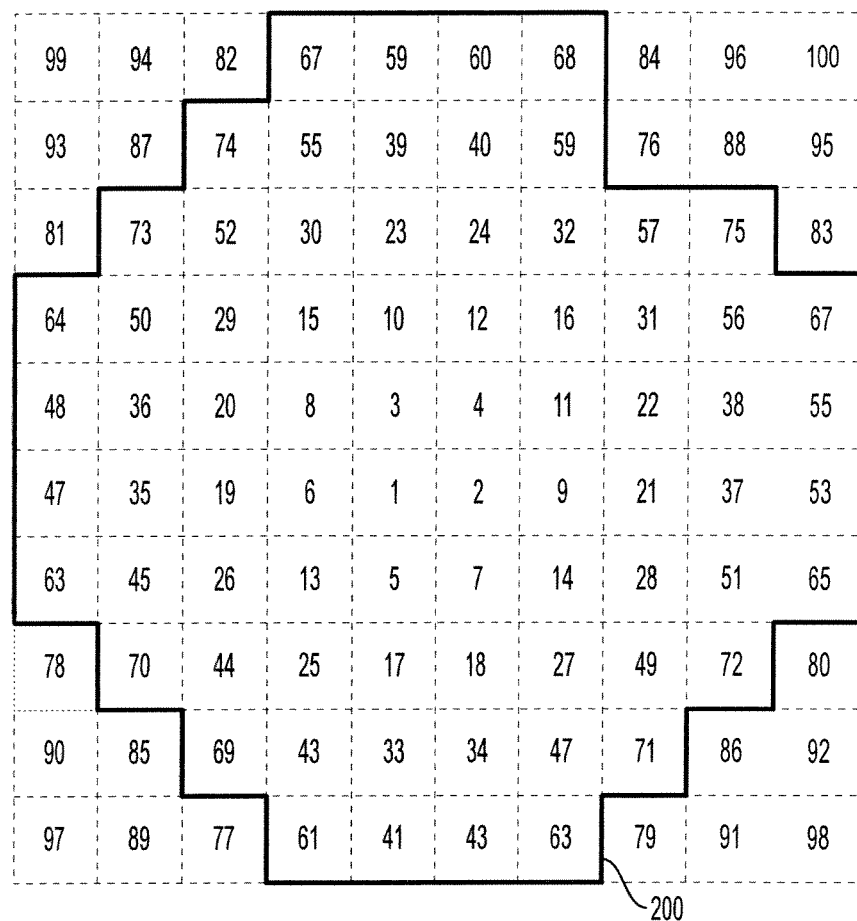
FIG. 2 is a representation of threshold values of pixels of a halftone cell.
Figure 3:
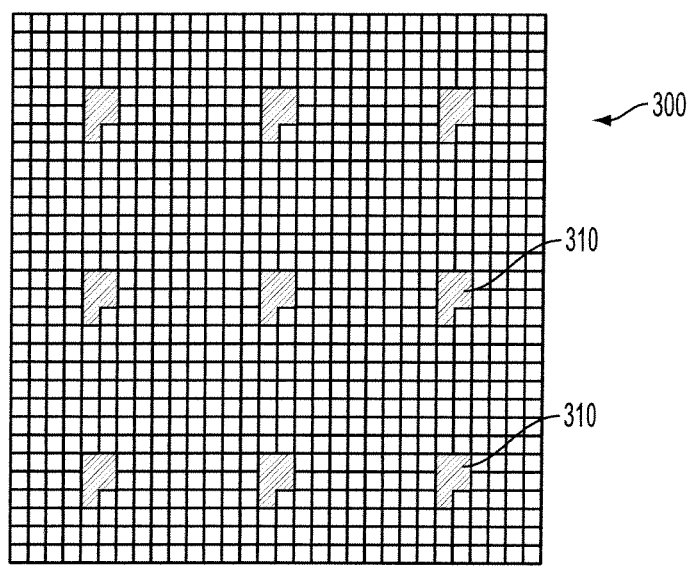
FIG. 3 is a portion of a halftone image for an input image having a spatially consistent 5% gray value.
Figure 4:
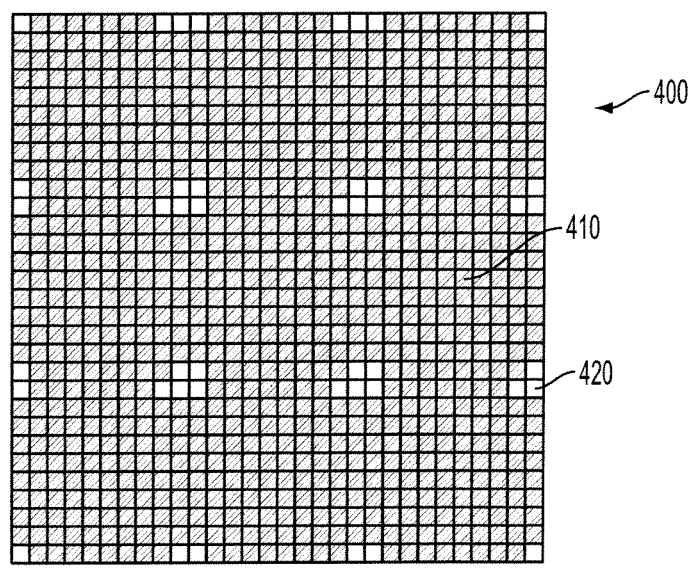
FIG. 4 is a portion of a halftone image for an input image having a spatially consistent 95% gray value.
Figure 5:
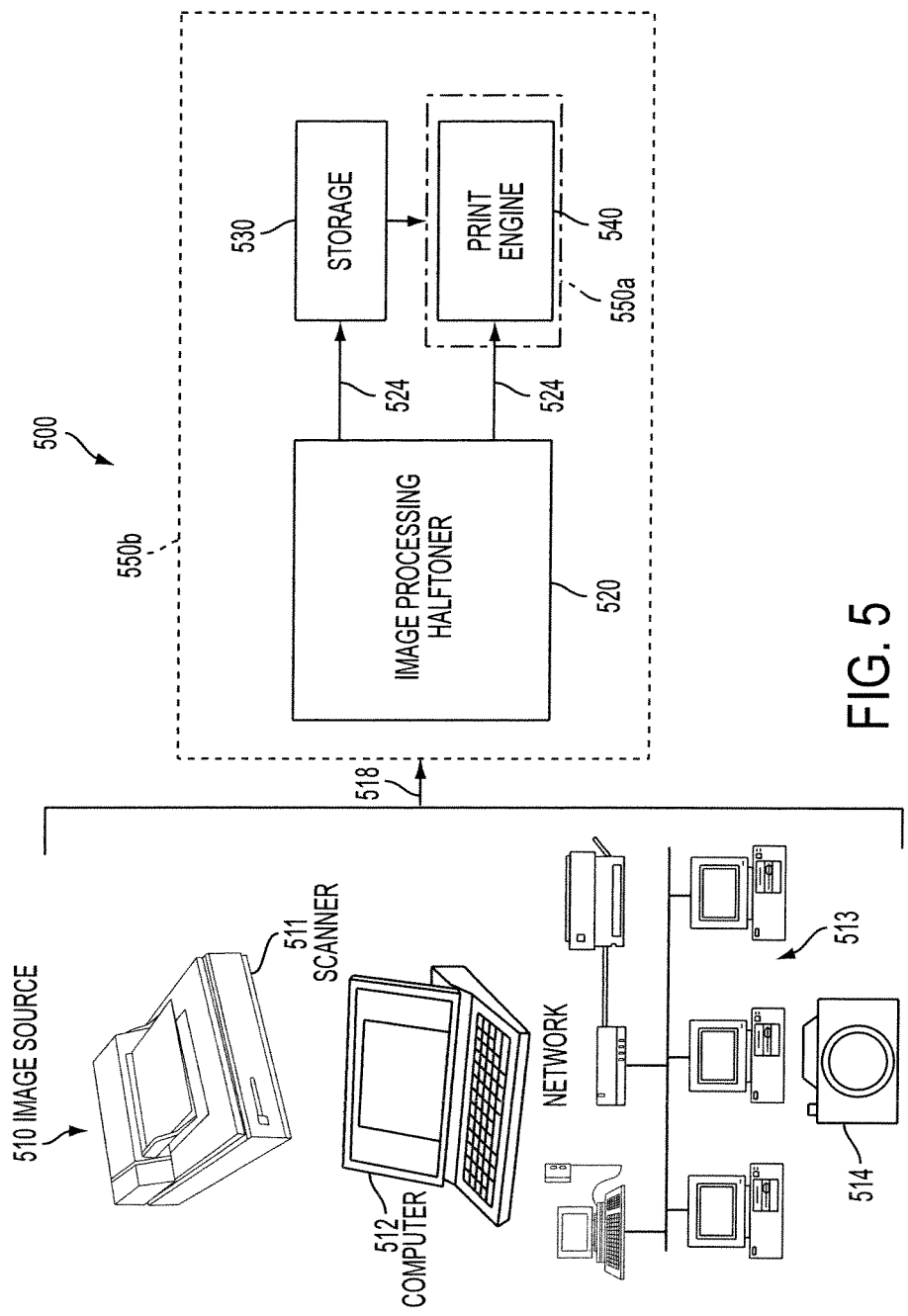
FIG. 5 is block diagram of an image processing system for generating a halftoned image using the parametrically controlled hexagonal dot shape function described herein.

Referring now to FIG. 5, the systems and methods disclosed herein are directed towards aspects of an image processing system, shown generally at 500, creating halftone screen output for printing a halftoned image by print engine 540 of a digital printer 550a or 550b. The image processing system 500 includes an image processing halftoner 520 transforming image data 518 produced and/or provided by an image source 510 into halftoned image data also referred to as halftone screen output 524 used to print the image. Examples of the image source 510 can include a scanner 511, computer 512, computer network 513, digital camera 514, or other image producing machine capable of generating the digital image data 518. The halftoner 520 can be one or more microcontrollers, microprocessors, digital signal processors, central processing units (CPUs), graphical card CPUs, graphical processing units (GPUs), application specific integrated circuits (ASICs), field programmable gate arrays (FPGAs) and other processor computing devices implementing the process of transforming digital image data 518 into halftone screen output 524 as described herein. In some embodiments, the halftoner 520 is contemplated as being separate from the printer 550a, in other embodiments it can be incorporated in the printer 550b, and in other embodiments the image processing used to generate the halftone screen output may be distributed among image processors in the printer and image processors separate from the printer.

The image data 518 supplied to the halftoner 520 by the image source 510-514, either directly or indirectly, can include image pixels having pixel values. An "image" as used herein is a pattern of physical light emitting and/or reflecting and/or absorbing elements that can be printed or displayed for viewing. A digital image is formed of "image data" representing these physical elements, which can be referred to as "pixels." Image data includes pixel location information, corresponding to the location of the pixels in the image, and pixel values representing a grayscale or color density to be produced in the image at the corresponding location. Pixel values can be represented as a bit in a "binary form" of an image, a gray-scale value in a "grayscale form" of an image representing the gray level of the image pixel, such as for example a value falling in the range of 0 to 255 (though others can be used), or a set of color space coordinates in a "color coordinate form" of an image and stored and/or provided in the form of a two-dimensional array defining the image.

It is well understood that most digital color printers operate in a binary mode, i.e., for each color separation, a corresponding colorant spot is either printed or not printed at a specified image location or pixel. As described above, digital color halftoning controls the printing of colorant spots, typically in the a pattern of periodic clustered-dots for each colorant separation, for combinations of colorants of a colorant set, where the spatial averaging of the printed dots, such as by the human visual system, provides the illusion of the required continuous color tones, also referred to as contones. The present systems and methods apply to the processing of color images, wherein each separation is treated, effectively, as a gray-scale or continuous tone image for a corresponding colorant in the colorant set. Accordingly, references made herein to the processing of continuous tone (contone), or gray scale, images is intended to refer to the processing of image color separations.

The halftoner 520 evaluates the dot shape function described herein at the location of each pixel in the contone input image data 518, or a portion thereof, being halftoned to produce the halftone screen output 524 for each halftone cell. The pixels of the halftone screen are at set positions with respect to one another and each halftone screen pixel has a position which corresponds with and is associated with a position on the original contone picture. Each halftone cell, represented by its respective dot shape function, corresponds to a respective portion of the contone image being halftoned and the cells are tiled together to represent the entire image, or the portions thereof, being halftoned. The input image pixels in each halftone cell are rank ordered according to their respective dot shape function values, and a threshold value from 0% to 100% is assigned to each pixel according to its rank in the halftone screen output 524. The halftone screen output 524 is used to render the halftoned image with print engine 540 by darkening the pixels in accordance with their threshold values to represent the appropriate gray scale level of the contone image.

The halftone screen output 524 can include one or more arrays of threshold values, along with 3 parameters—width, height of a given array, and an offset of successive rows of the array, as taught by U.S. Pat. No. 4,149,194 for "Variable angle electronic halftone screening" to Holladay, and U.S. Pat. No. 4,185,304 "Electronic Halftone Screening," also to Holladay, both of which are hereby incorporated herein by reference in their entirety. The halftone screens can be specified in other common formats, such as using angles and frequencies along with the dot shape function, as taught generally by U.S. Pat. No. 4,196,451 for "Electronic Halftone Generator" to Pellar, and U.S. Pat. No. 4,149,183 for "Electronic Halftone Generator" also to Pellar, both of which are hereby incorporated herein by reference in their entirety.

The halftone screen output 524 can be used to print the halftoned image by print engine 540, or it can be stored by a storage device 530 for subsequent printing. Examples of the storage device 530 can include one or more of a computer memory, such as random access memory (RAM) or storage media, such as, magnetic media including, but not limited to, magnetic tapes and discs and optical media such as CD ROM, etc. Furthermore, the storage device 530 may include a computer network for transmitting output from the image processing halftoner 520 to another processor, image processing system or rendering device. The printing device 540 can include a print engine such as ink-jet print engines, xerographic print engines and electrophotographic print engines.

A known dot shape function, such as the classic Pellar dot shape function, also known as the Euclidean profile, is described in U.S. Pat. Nos. 4,196,451 and 4,149,183 to Pellar, incorporated by reference above. It can also be described as a sum of two cosine functions:

$$Q=\cos[2\pi(h_1/H_1)]+\cos[2\pi(h_2/H_2)] \quad (1)$$

where Q is the threshold function that is compared to image pixel values in the halftoning operation. In practice, Q would be scaled to have the same range as the image data, e.g., [0, 255].

Figure 6:
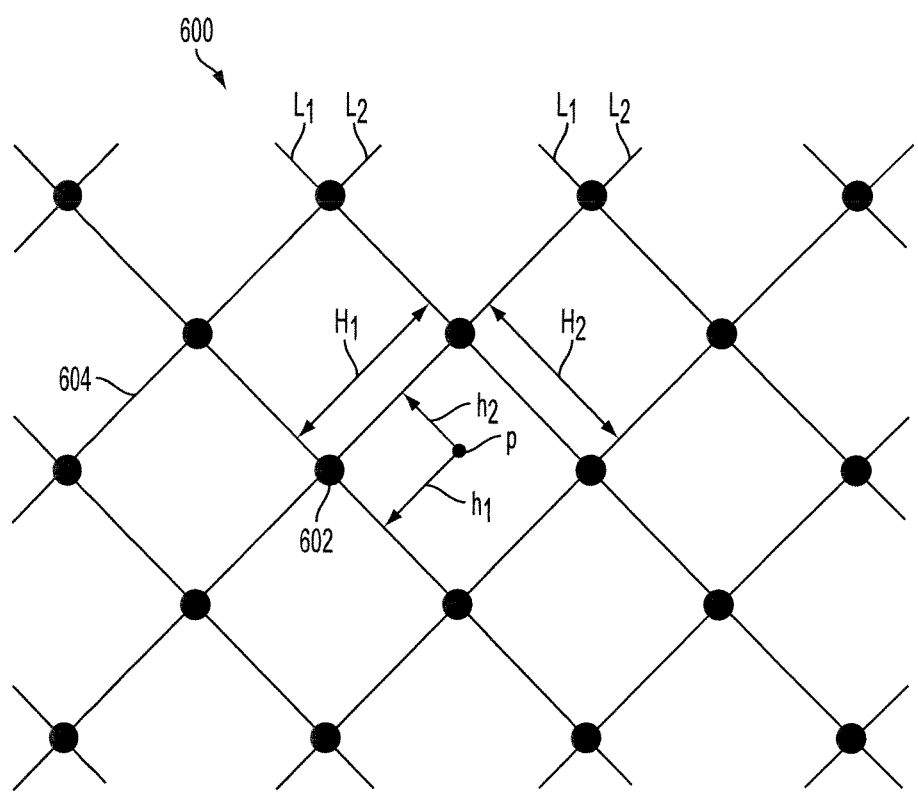
FIG. 6 is portion of an orthogonal grid illustrating parameters used in generating a dot shape threshold function for an orthogonal halftone screen.

As shown in FIG. 6, in instances where the clustered-dot screen is an orthogonal halftone screen 600, all clusters, or dots, are centered on the intersection points 602 of a grid, or lattice 604, defined by two sets of parallel lines of which the parallel lines $L_1$ of the first set are perpendicular to the parallel lines $L_2$ of the second set. The periods of the lattice 604 in two different directions, the 45° and −45° directions in FIG. 6, are defined by the shortest distance between the adjacent parallel lines $L_1$ of the first group, denoted by $H_1$ and the shortest distance between the adjacent parallel lines $L_2$ of the second group, denoted by $H_2$. The threshold value at an arbitrary point p, defined by the distances, $h_1$ and $h_2$, from the point p to the adjacent orthogonal grid lines $L_1$ and $L_2$, respectively, is given by the function Q in Equation (1). It is interesting to note that since the two cosine functions in Q of Equation (1) are defined with periods $h_1/H_1$ and $h_2/H_2$, respectively, it has been found that it does not matter which particular grid lines within each of the 2 sets are chosen to define the distance $h_1$ or $h_2$.

Figure 7:
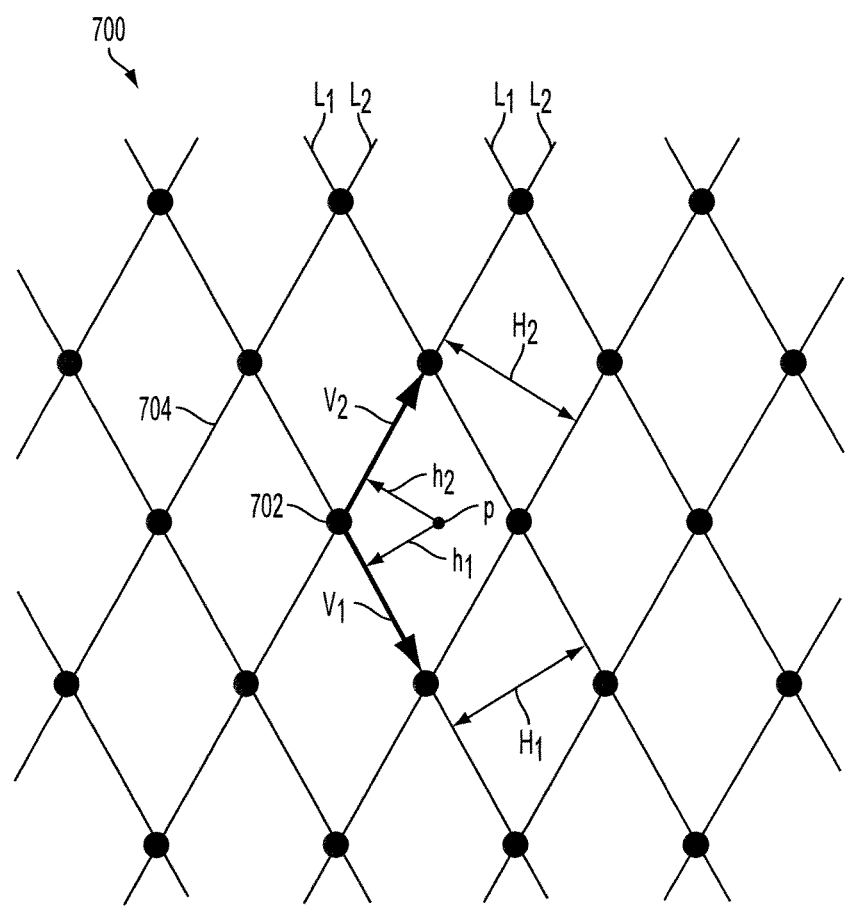
FIG. 7 is a portion of a non-orthogonal grid illustrating parameters used in forming a dot shape threshold function for generating a non-orthogonal halftone screen.

Referring now to FIG. 7, an arbitrary non-orthogonal halftone screen 700 can be defined by two spatial vectors, $V_1$ and $V_2$, as shown. The vectors $V_1$ and $V_2$ define a parallelogram that can completely tile the plane of the image being halftoned. The dot shape function can be evaluated within such a parallelogram tile to form a cell. Parallelogram cells can be converted to other geometric forms, such as Holladay bricks. In instances where the clustered-dot screen is a non-orthogonal halftone screen 700, all clusters are centered on the intersection points 702 of a grid 704 defined by two sets of parallel lines of which the parallel lines $L_1$ of the first set are not perpendicular to (and not parallel to) the parallel lines $L_2$ of the second set. The dot shape function for non-orthogonal clusters can be also described by the same threshold function Q in Equation (1), where the periods of the grid, $H_1$ and $H_2$, are defined in the two directions, perpendicular to the non-orthogonal grid lines. Similar to the orthogonal case, choosing different grid lines within a parallel set of lines as the distance reference will not change the values of the dot shape function.

Additional vectors can be used in defining the halftone screen grid. A vector of interest, $V_3$ is the one that connects an intersection point with a second closest neighboring grid point. The spatial vector $V_3$ is defined as the summation of $V_1$ and $V_2$, or:

$$V_3=V_1+V_2. \quad (2)$$

For an orthogonal screen, this vector is longer than $V_1$ and $V_2$ by the square root of 2, and is angled 45° from those vectors. As the angles of the grid depart from orthogonal, the length of $V_3$ becomes closer to $V_1$ and $V_2$. As shown in the hexagonal halftone screen 800 in FIG. 8, as the angle between $V_1$ and $V_2$ approaches 120°, for $V_1 \approx V_2$ the length of $V_3$ approaches the length of $V_1$ and $V_2$ the halftone screen grid 804 approaches a regular hexagonal lattice. Each intersection point 802 in the hexagonal halftone screen grid 804 has 6 nearest neighboring intersection points that are substantially equidistant, and separated from each other in a hexant arrangement.

Figure 8:
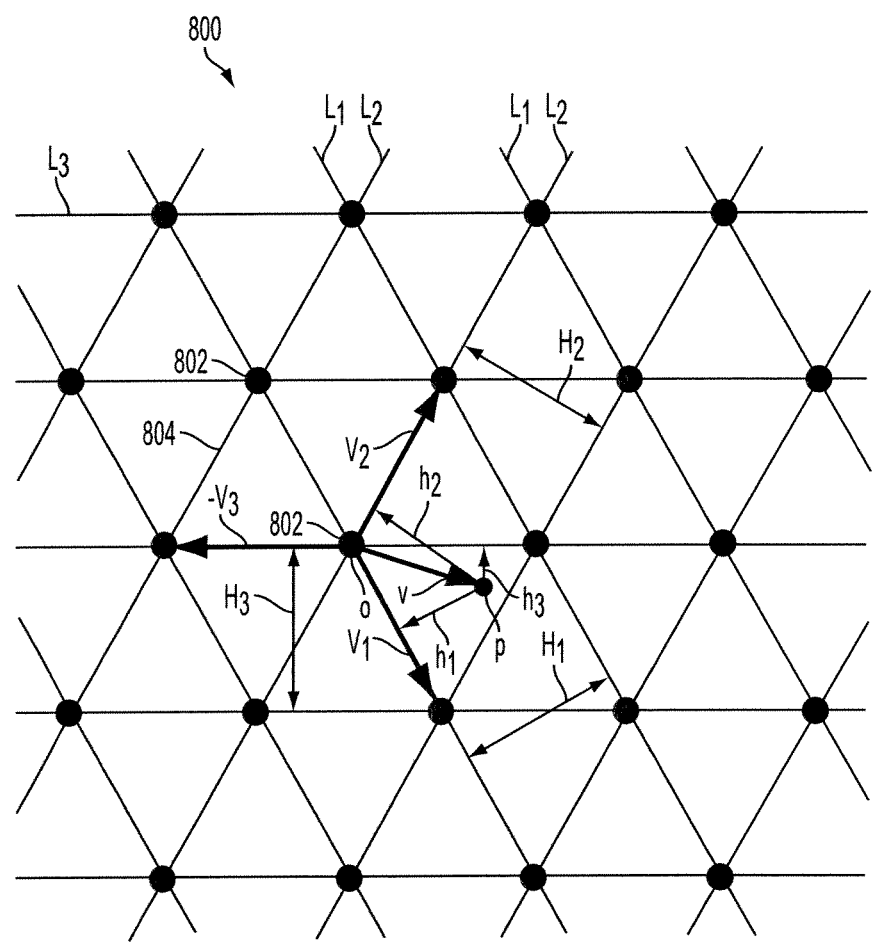
FIG. 8 is a portion of a non-orthogonal grid illustrating parameters used in forming a parametrically controlled hexagonal dot shape threshold function for generating a hexagonal halftone screen.

A third set of parallel lines $L_3$ crossing intersecting points 802 and parallel to the direction of $V_3$ can be added to the grid 804, as shown in FIG. 8. The period of the third set of parallel lines is defined as $H_3$. By vector analysis the three periods, $H_1$, $H_2$ and $H_3$, defined here can be also described as functions of the three spatial vectors, $V_1$, $V_2$ and $V_3$:

$$H_1=|V_2 \times V_1|/|V_1|=|V_3 \times V_1|/|V_1|; \quad (3a)$$

$$H_2=|V_1 \times V_2|/|V_2|=|V_3 \times V_2|/|V_2|; \quad (3b)$$

$$H_3=|V_1 \times V_3|/|V_3|=|V_2 \times V_3|/|V_3|; \quad (3c)$$

where $V_1 \times V_2$ represents a vector product, or cross product of two vectors $V_1$ and $V_2$, and $|V|$ is the magnitude of the vector V. By the definition of vector $V_3$, or Equation (2), it can be shown that the magnitudes of all vector products shown in Equations (3a)-(3c) are equal and the value of these magnitudes represents the area A of the parallelograms defined by any two of the three vectors $V_1$, $V_2$ and $V_3$, or:

$$A=H_1|V_1|=H_2|V_2|=H_3|V_3|. \quad (4)$$

For the following derivation, we select a intersection point o as an reference point and define the three vectors $V_1$, $V_2$ and $V_3$ as all of them share the same origin. Then, the distances from an arbitrary point p to the three spatial vectors $V_1$, $V_2$ and $V_3$ can be described by the following equations, where the spatial vector v is defined as from the reference point o to the arbitrary point p:

$$h_1=|v \times V_1|/|V_1| \quad (5a)$$

$$h_2=|v \times V_2|/|V_2| \quad (5b)$$

$$h_3=|v \times V_3|/|V_3| \quad (5c)$$

Using Equation (4), we can rewrite Equations (5a)-(5c) as:

$$\hat{h}_1 = h_1/H_1 = |v \times V_1|/A \quad (6a)$$

$$\hat{h}_2 = h_2/H_2 = |v \times V_2|/A \quad (6b)$$

$$\hat{h}_3 = h_3/H_3 = |v \times V_3|/A \quad (6c)$$

where $\hat{h}_1$, $\hat{h}_2$, and $\hat{h}_3$ are heights normalized by the grid periods $H_1$, $H_2$ and $H_3$, respectively and have non-negative values.

We have found a new dot shape function for hexagonal shaped clustered-dot screens:

$$Q = \cos[2\pi(h_1/H_1)] + \cos[2\pi(h_2/H_2)] + \cos[2\pi(h_3/H_3)] \quad (7a)$$

or $$Q = \cos(2\pi\hat{h}_1) + \cos(2\pi\hat{h}_2) + \cos(2\pi\hat{h}_3) \quad (7b)$$

Since the vector $V_3$ is defined as the sum of two vectors $V_1$ and $V_2$, the distance $h_3$ in Equation (7a) and the corresponding normalized height $\hat{h}_3$ in Equation (7b) are not independent. The vector product in Equation (6c) can be expressed as:

$$v \times V_3 = v \times V_1 + v \times V_2 \quad (8)$$

In Equation (8) the three vector products are in the same direction but may carry different signs, plus or minus. Depending on the way of defining the spatial vectors, the normalized height $\hat{h}_3$ given by Equation (6c) may be equal to either the sum or the difference of $\hat{h}_1$ and $\hat{h}_2$. To avoid the ambiguity, we define the two spatial vectors $V_1$ and $V_2$, such that both vectors start from the reference point o and the angle from $V_1$ to $V_2$ is positive and the angle is substantially equal to 120°. The vector $V_3$ is defined by Equation (2) and all distances used for the non-orthogonal hexagonal clustered-dot screen are defined by vector product and Equations (5a)-(5c). With these above specified definitions, the following relation between the three normalized heights has been found:

$$\hat{h}_3 = |\hat{h}_2 - \hat{h}_1| \quad (9)$$

The hexagonal dot shape function in Equation (7b) can be described as a function of two independent variables $\hat{h}_1$ and $\hat{h}_2$ as follows:

$$Q = \cos(2\pi\hat{h}_1) + \cos(2\pi\hat{h}_2) + \cos(2\pi\hat{h}_1)\cos(2\pi\hat{h}_2) + \sin(2\pi\hat{h}_1)\sin(2\pi\hat{h}_2) \quad (10)$$

Using Equation 7(b), a parametrically controlled hexagonal halftone dot shape function $Q_1$ can be found as:

$$Q_1 = a_1 \cos(\pi(2h_1/H_1)) + a_2 \cos(\pi(2h_2/H_2)) + a_3 \cos(\pi(2h_3/H_3)) \quad (11)$$

where the parameter $a_i$ is a weight parameter that controls the rate at which the ith vertex of the dot approaches the vertex of a neighboring dot. When the $a_i$ are substantially equal, the growth of the dot is substantial equal in all 3 vector directions (positive and negative directions for each of the three vectors). When an $a_i$ value is larger than the other $a_i$ values, the dot becomes eccentric, growing at a faster rate in the direction (positive and negative directions) of the vector associated with the larger $a_i$. In this respect, this parameter can be used to control which vertices touch at particular gray levels. For example, the a parameter in Equation (11), ($a_1$, $a_2$, $a_3$) allows neighbor touching at one, two or three different respective gray levels, thereby avoiding tone instability caused by touching all neighbors simultaneously (i.e. at the same gray level).

The dot shape function $Q_1$ is a parametrically controlled hexagonal halftone dot shape function which is used to generate the hexagonal halftone screens for halftoning an image by transforming the image data 518 representing image pixels into halftoned image data 524, also referred to as halftone screen output, representing halftoned image dots that are printed to form a halftoned image. The parametrically controlled hexagonal dot shape function $Q_1$ (or $Q_2$ or $Q_3$ described below) is used to form, or "grow", a dot to be printed within each halftone cell by darkening pixels in correspondence to the image gray level being represented at that portion of the halftoned image. Halftoned image objects, or image regions, having darker gray levels are formed by printing larger dots, while those having lighter gray levels are formed by printing smaller dots.

Figure 9A:
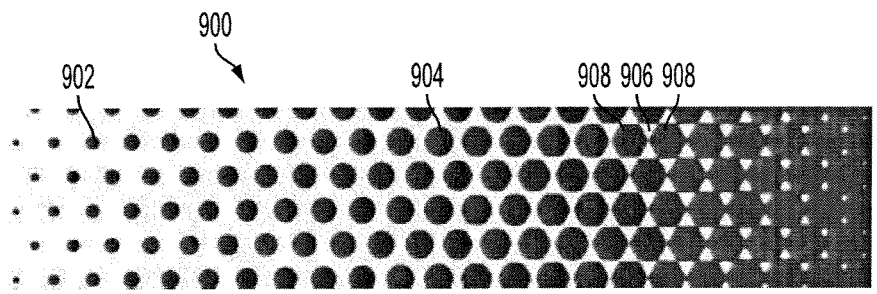
FIGS. 9A-9E are gray wedges having varying gray levels printed using the parametrically controlled hexagonal dot shape function described herein, where parameters are varied to control the shape of the sides of the dot.

Referring to FIG. 9A, an example halftone screen output generated by the parametrically controlled dot shape function $Q_1$ of Equation (11) is shown producing a halftoned image 900 having a continuously varying gray level progressing from a minimum (e.g. 0 representing the lowest or lightest gray level) at the left, to a maximum (e.g. 255, or other scaled number, representing the highest or darkest gray level) at the right. The clustered-dots produced by the parametrically controlled dot shape function $Q_1$ of Equation (11) begin as substantially circular dots 902 at low gray levels, growing to some selected form of hexagon being substantially hexagonal, producing for example regular hexagonal dots 904 in FIG. 9A, at mid-gray levels, and closes producing a plurality of compact triangular holes 906 between adjacent dots 908 in the darker or higher gray levels.

It can be desirable to control the contour (shape) of a dot perimeter and the touch points to compensate for attributes of the marking engine used to print the halftoned image. The parametrically controlled dot shape function $Q_2$ shown in Equation (12) utilizes an additional set of parameters to control the roundness and convexity/concavity of the dot sides and the sharpness of the vertex touch points.

$$Q_2 = a_1 \cos(\pi(2h_1/H_1)^{\gamma_1}) + a_2 \cos(\pi(2h_2/H_2)^{\gamma_2}) + a_3 \cos(\pi(2h_3/H_3)^{\gamma_3}) \quad (12)$$

wherein $\gamma_i$ controls the shape of the sides of the dot. In the dot shape function of Equation (12), the perpendicular distance from the point of interest p to the closest grid lines 804 is used to determine each respective h.

Figure 9B:
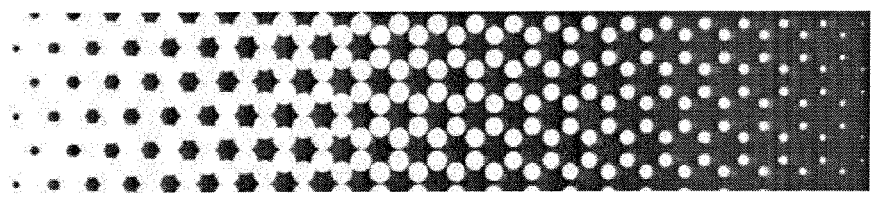
Figure 9C:
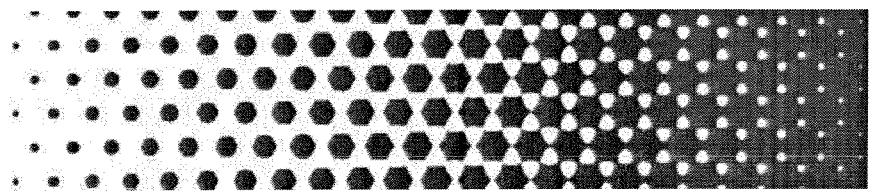

Using a dot shape function $Q_2$ in which $\gamma < 1$ results in printed hexagonal dots having pincushion (i.e. concave) shaped sides, producing sharper touch points with adjacent dots, which can improve stability of gray tone for marking processes with significant growth. The halftone output of FIG. 9A illustrates the use of a parametrically controlled dot shape function $Q_2$ with $a_i = 1$ and $\gamma_i = 1.0$, FIG. 9B illustrates the use of a parametrically controlled dot shape function $Q_2$ with $a_i = 1$ and $\gamma_i = 0.6$, FIG. 9C illustrates the use of a parametrically controlled dot shape function $Q_2$ with $a_i = 1$ and $\gamma_i = 0.8$.

Figure 9D:
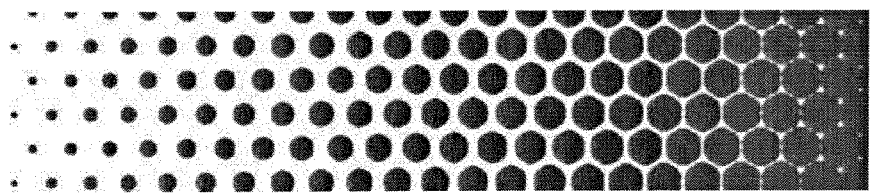
Figure 9E:
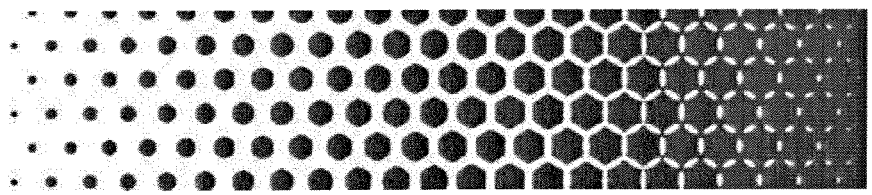

Using a dot shape function $Q_2$ having a $\gamma > 1$ results in a rounder, convex shape, to the printed dot, which can delay (i.e. move) the touching of adjacent dots to darker gray levels. FIG. 9D illustrates the use of a parametrically controlled dot shape function $Q_2$ with $a_i = 1$ and $\gamma_i = 1.2$, and FIG. 9E illustrates the use of a parametrically controlled dot shape function $Q_2$ with $a_i = 1$ and $\gamma_i = 1.5$. In offset printing, rounder dots with delayed touching are sometimes used for halftoning subject matter that is primary at image highlight levels, so that a relatively round, compact spot with no touching is used for most of the image.

Figure 10A:
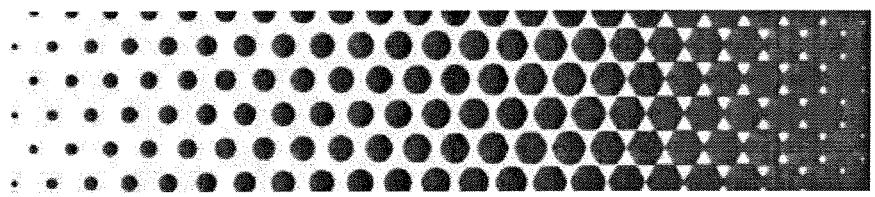
FIGS. 10A-10I are gray wedges having varying gray levels printed using the parametrically controlled hexagonal dot shape function described herein, where parameters are varied to control the eccentric of the dot.
Figure 10B:
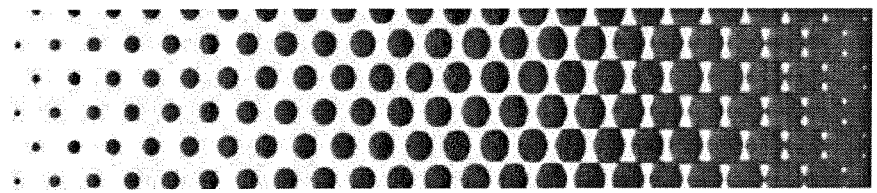
Figure 10C:
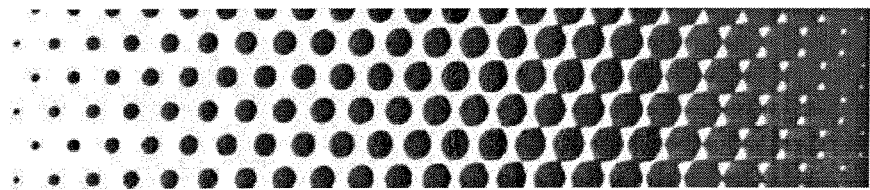
Figure 10D:
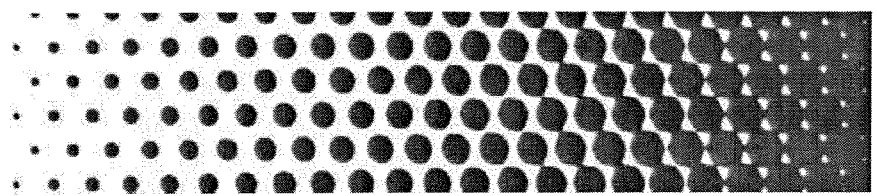
Figure 10E:
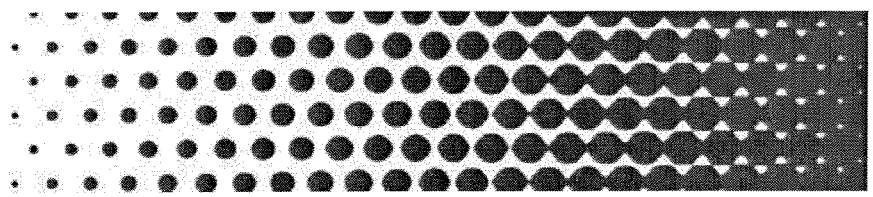
Figure 10F:
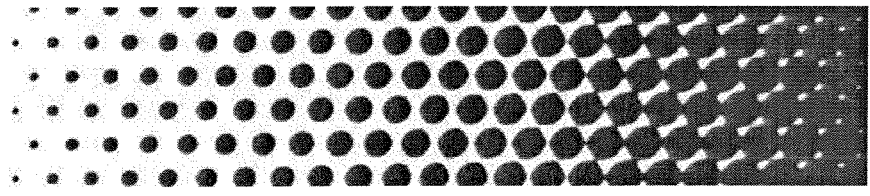

FIGS. 10A-10I further illustrate how the dot shape function $Q_2$ can be used to control neighbor halftone dot touching as a function of halftoned image gray level. In FIGS. 10A-10I, $\gamma_i = 1$. In FIG. 10A, $a_1 = a_2 = a_3 = 1.0$. In FIG. 10B, $a_1 = 1.25$, $a_2 = 1.25$, and $a_3 = 1.0$. In FIG. 10C, $a_1 = 1.2$, $a_2 = 1.0$, and $a_3 = 1.0$. In FIG. 10D, $a_1 = 1.0$, $a_2$ 1.2, and $a_3 = 1.0$. In FIG. 10E, $a_1 = 1.0$, $a_2 = 1.0$, and $a_3 = 1.25$. In FIG. 10F $a_1 = 1.0$, $a_2 = 0.8$, and $a_3 = 1.0$.

Figure 10G:
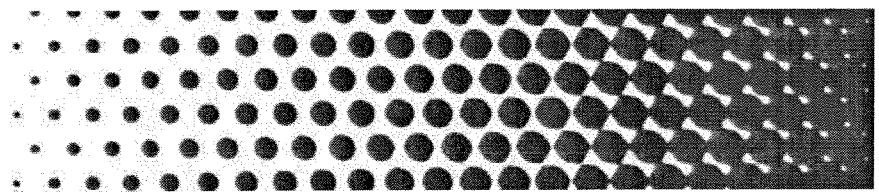
Figure 10H:
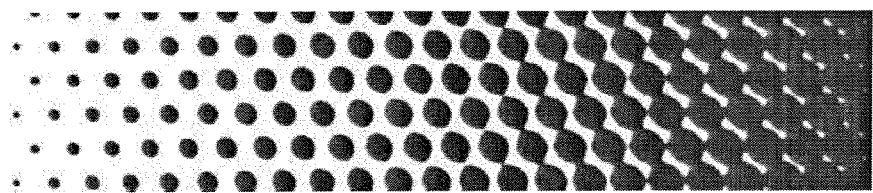
Figure 10I:
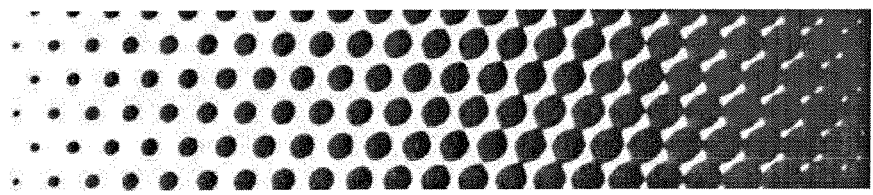

In FIG. 10G, $a_1=0.8$, $a_2=1.0$, and $a_3=1.0$. In FIG. 10H, $a_1=0.8$, $a_2=1.2$, and $a_3=1.0$. In FIG. 10I, $a_1=1.2$, $a_2=0.8$, and $a_3=1.0$.

Any halftone dot shape function, such as those represented by the dot function of Equations (11) and (12) can be inverted, as shown by $Q_3$ of Equation (13), to provide an opposite growth sequence, which could be desirable in some marking processes. More specifically:

$$Q_3 = (a_1+a_2+a_3) - (a_1 \cos(\pi(2h_1/H_1)^{\gamma 1}) + a_2 \cos(\pi(2h_2/H_2)^{\gamma 2}) + a_3 \cos(\pi(2h_3/H_3)^{\gamma 3})) \quad (13)$$

having equation parameters as defined above with respect to Equations (11) and (12). The dot shape function $Q_3$ provides an interesting compact growth sequence from dark triangles at lower gray levels, to dark hexagons as midtones, to light round holes between adjacent dots in the darker or higher gray levels. As with the un-inverted spot function Q1, Q2, this inverted function $Q_3$ can be scaled and offset to a desired range (e.g., 0 to 255).

The hexagonal dot shape function can be rotated within a fixed position of the hexagonal grid. More specifically, it is contemplated rotating an entire screen (e.g. the frequency vectors used in generating the screen) along with a dot shape function. But additionally, the present dot shape function(s) $Q_1$, $Q_2$, and $Q_3$ can be rotated independently of the screen geometry. That is, dot shape function rotation can be performed by first defining the hexagonal screen geometry, which can be expressed in various equivalent forms using spatial vectors, cells, or frequency vectors, as described in US Publication Nos. 2008/0130055 and 2008/0130054 to Wang, et al., and U.S. Pat. No. 6,798,539 to Wang, et al., mentioned above. Next, a coordinate rotation of the hexagonal dot shape function relative to the screens is performed. That can be accomplished by defining the screen geometry using coordinates (x, y) and using (x', y') in Equation (11), (12) or (13), where:

$$x' = x \cos(\theta) - y \sin(\theta) \quad (14)$$

$$y' = x \sin(\theta) + y \cos(\theta) \quad (15)$$

and $\theta$ is the rotation angle between the dot and the screen orientation. Applying this extension to the dot shape function in Equations (11), (12) or (13) could require some editing of the resulting threshold array to avoid spurious dots for some rotation angles, is so desired.

Figure 11A:
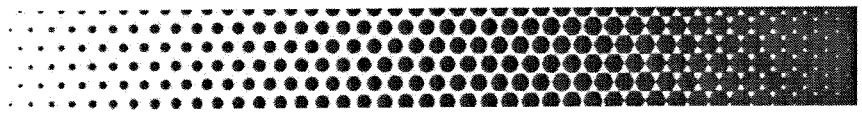
FIGS. 11A-11G are gray wedges having varying gray levels printed using the parametrically controlled hexagonal dot shape function described herein, where parameters are varied to control the rotation of the dot.
Figure 11B:
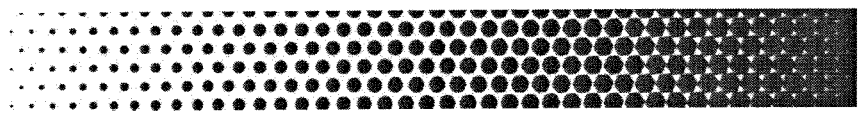
Figure 11C:
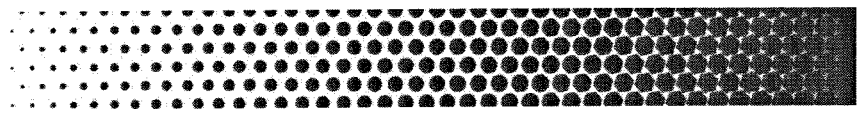
Figure 11D:
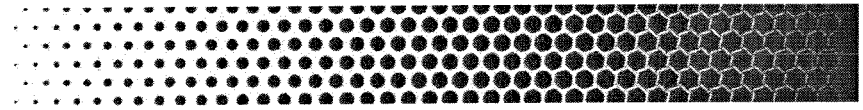
Figure 11E:
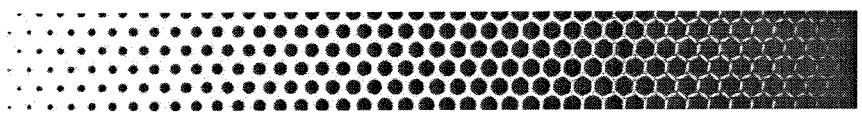
Figure 11F:
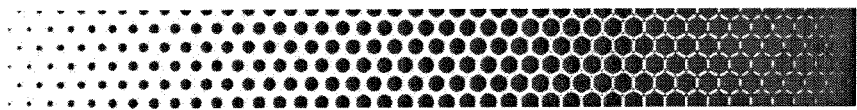
Figure 11G:
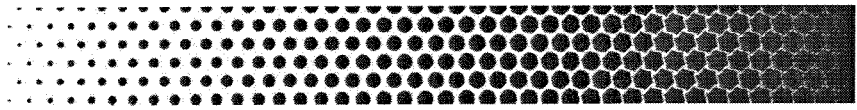

FIGS. 11A-11G illustrate how the dot shape function $Q_2$ can be rotated relative to the screen geometry in this manner, as shown by gray wedges having varying gray levels which were printed using the dot shape function rotated by different amounts. In FIG. 11A $\theta=0°$. In FIG. 11B $\theta=5°$. In FIG. 11C $\theta=10°$. In FIG. 11D $\theta=15°$. In FIG. 11E $\theta=20°$. In FIG. 11F $\theta=30°$. In FIG. 11G $\theta=45°$.

The present apparatus and method utilize a parametrically controlled hexagonal halftone dot shape function $Q_1$, $Q_2$ and $Q_3$ that provides optimum dot touch points as well as compact growth. The touch points which are generated can prevent a tone reproduction bump, while the compact growth through the gray ranges ensures maximum stability. The method defines a threshold function $Q_1$, $Q_2$ and $Q_3$ using the weighted sum of 3 cosines that are functions of distance from 3 respective reference lines defined by the sides of the hexagon. Algebraic powers of the distances control the shape of the sides of the dot and the sharpness of each spot touch point with its neighboring dots. Weights of the cosines control a sequencing of touches, such that contact with the neighboring dots can occur at three different gray levels thereby avoiding a large instability that can occur for simultaneous touching. Dot rotation can also be performed by rotating the coordinate system.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of halftoning which transforms image data representing contone image pixels into halftoned image data representing halftone dots of a halftoned image, the method comprising:
    receiving contone image data including pixel values representing gray-scale color densities and pixel location information; and
    halftoning the image using an image processor generating clustered-dot halftone screen output representing halftone dots by comparing the image pixel values to a threshold function in the form of a parametrically controlled hexagonal dot shape function, wherein the hexagonal dot shape function includes weight parameters controlling the rate at which a respective vertex of a halftone dot approaches a vertex of a neighboring halftone dot in relation to gray level.

2. The method of halftoning of claim 1 wherein the parametrically controlled hexagonal dot shape function is $$Q_1 = a_1 \cos(\pi(2h_1/H_1)) + a_2 \cos(\pi(2h_2/H_2)) + a_3 \cos(\pi(2h_3/H_3))$$

where $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a respective one of the parallel lines from each set, and $a_1$ $a_2$ and $a_3$ are weight parameters controlling the rate at which a respective vertex of a halftone dot approaches a vertex of a neighboring halftone dot in relation to gray level, the halftone dots being substantially circular in halftoned image highlights having lower gray levels, substantially hexagonal in halftoned image midtones, and having triangular holes between adjacent dots in halftoned image shadows having higher gray levels.

3. The method of claim 1 wherein the parametrically controlled hexagonal dot shape function is $$Q_2 = a_1 \cos(\pi(2h_1/H_1)^{\gamma 1}) + a_2 \cos(\pi(2h_2/H_2)^{\gamma 2}) + a_3 \cos(\pi(2h_3/H_3)^{\gamma 3})$$

where $\gamma_i$ controls the shape of the sides of the halftone dots, $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a closest respective one of the parallel lines from each set, and $a_1$ $a_2$ and $a_3$ are weight parameters controlling the rate at which a respective vertex of a halftone dot approaches a vertex of a neighboring halftone dot in relation to gray level, the halftone dots being substantially circular in halftoned image highlights having lower gray levels, substantially hexagonal in halftoned image midtones, and having triangular holes between adjacent dots in halftoned image shadows having higher gray levels.

4. The method of claim 3 wherein $\gamma_i$ is greater than 1 producing halftone screen output resulting in printed hexagonal dots having concave-shaped sides, thereby producing sharper touch points with adjacent halftone dots, or less than 1 producing halftone screen output resulting in printed hexagonal dots having convex-shaped sides.

5. The method of claim 3 wherein $Q_2$ is scaled to have the same range as the image data gray levels represented by the pixel values.

6. The method of claim 3 further comprising performing dot shape function rotation independently of halftone screen geometry by defining the halftone screen geometry using coordinates (x, y) and using (x', y') in $Q_2$ where:

$$x' = x\cos(\theta) - y\sin(\theta)$$

$$y' = x\sin(\theta) + y\cos(\theta)$$

and $\theta$ is the rotation angle between the dot and the screen orientation.

7. The method of claim 3 further comprising rendering a halftoned image with a print engine by printing halftone dots having pixels darkened in accordance with their threshold values to represent the appropriate gray scale level of the contone image.

8. The method of claim 1 wherein the parametrically controlled hexagonal dot shape function is:

$$Q_3 = (a_1 + a_2 + a_3) - (a_1 \cos(\pi(2h_1/H_1)^{\gamma 1}) + a_2 \cos(\pi(2h_2/H_2)^{\gamma 2}) + a_3 \cos(\pi(2h_3/H_3)^{\gamma 3}))$$

where $\gamma_i$ controls the shape of the sides of the halftone dots, $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a closest respective one of the parallel lines from each set, and $a_1$ $a_2$ and $a_3$ are weight parameters controlling the rate at which a respective vertex of a halftone dot approaches a vertex of a neighboring halftone dot in relation to gray level, providing a compact growth sequence from dark triangles at lower gray levels, to dark hexagons as midtones, to light round holes between adjacent dots in the darker or higher gray levels.

9. The method of claim 8 further comprising performing dot shape function rotation independently of halftone screen geometry by defining the halftone screen geometry using coordinates (x, y) and using (x', y') in $Q_3$ where:

$$x' = x\cos(\theta) - y\sin(\theta)$$

$$y' = x\sin(\theta) + y\cos(\theta)$$

and $\theta$ is the rotation angle between the dot and the screen orientation.

10. An image halftoner which transforms image data representing contone image pixels into halftoned image data representing halftone dots of a halftoned image comprising:
an image processor receiving contone image data including pixel values representing gray-scale color densities and pixel location information, the image processor generating clustered-dot halftone screen output of halftone dots by comparing the image pixel values to a threshold function in the form of a parametrically controlled hexagonal dot shape function, wherein the hexagonal dot shape function includes weight parameters controlling the rate at which a respective vertex of a halftone dot approaches a vertex of a neighboring halftone dot in relation to gray level.

11. The image halftoner of claim 10 wherein the parametrically controlled hexagonal dot shape function is $$Q_1 = a_1 \cos(\pi(2h_1/H_1)) + a_2 \cos(\pi(2h_2/H_2)) + a_3 \cos(\pi(2h_3/H_3))$$

where $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a respective one of the parallel lines from each set, and $a_1$ $a_2$ and $a_3$ are weight parameters controlling the rate at which a respective vertex of a halftone dot approaches a vertex of a neighboring halftone dot in relation to gray level, the halftone dots being substantially circular in halftoned image highlights having lower gray levels, substantially hexagonal in halftoned image midtones, and having triangular holes between adjacent dots in halftoned image shadows having higher gray levels.

12. The image halftoner of claim 10 wherein the parametrically controlled hexagonal dot shape function is $$Q_2 = a_1 \cos(\pi(2h_1/H_1)^{\gamma 1}) + a_2 \cos(\pi(2h_2/H_2)^{\gamma 2}) + a_3 \cos(\pi(2h_3/H_3)^{\gamma 3})$$

where $\gamma_i$ controls the shape of the sides of the halftone dots, $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a closest respective one of the parallel lines from each set, and $a_1$ $a_2$ and $a_3$ are weight parameters controlling the rate at which a respective vertex of a halftone dot approaches a vertex of a neighboring halftone dot in relation to gray level, the halftone dots being substantially circular in halftoned image highlights having lower gray levels, substantially hexagonal in halftoned image midtones, and having triangular holes between adjacent dots in halftoned image shadows having higher gray levels.

13. The image halftoner of claim 12 wherein $\gamma_i$ is greater than 1 producing halftone screen output resulting in printed hexagonal dots having concave-shaped sides, thereby producing sharper touch points with adjacent halftone dots, or $\gamma_i$ is less than 1 producing halftone screen output resulting in printed hexagonal dots having convex-shaped sides.

14. The image halftoner of claim 12 wherein $Q_2$ is scaled to have the same range as the image data gray levels represented by the pixel values.

15. The image halftoner of claim 12 performing dot shape function rotation independently of halftone screen geometry by defining the halftone screen geometry using coordinates (x, y) and using (x', y') in $Q_2$ where:

$$x' = x\cos(\theta) - y\sin(\theta)$$

$$y' = x\sin(\theta) + y\cos(\theta)$$

and $\theta$ is the rotation angle between the dot and the screen orientation.

16. The image halftoner of claim 10 wherein the parametrically controlled hexagonal dot shape function is:

$$Q_3 = (a_1 + a_2 + a_3) - (a_1 \cos(\pi(2h_1/H_1)^{\gamma 1}) + a_2 \cos(\pi(2h_2/H_2)^{\gamma 2}) + a_3 \cos(\pi(2h_3/H_3)^{\gamma 3}))$$

providing a compact growth sequence from dark triangles at lower gray levels, to dark hexagons as midtones, to light round holes between adjacent dots in the darker or higher gray levels.

17. The image halftoner of claim 16 performing dot shape function rotation independently of halftone screen geometry by defining the halftone screen geometry using coordinates (x, y) and using (x', y') in $Q_3$ where:

$$x' = x\cos(\theta) - y\sin(\theta)$$

$$y' = x\sin(\theta) + y\cos(\theta)$$

and $\theta$ is the rotation angle between the dot and the screen orientation.

18. A printing device which transforms image data representing contone image pixels into halftoned image data representing halftone dots of a halftoned image comprising:

an image processor receiving contone image data including pixel values representing gray-scale color densities and pixel location information, the image processor generating clustered-dot halftone screen output of halftone dots by comparing the image pixel values to a threshold function in the form of a parametrically controlled hexagonal dot shape function, wherein the hexagonal dot shape function includes weight parameters controlling the rate at which a respective vertex of a halftone dot approaches a vertex of a neighboring halftone dot in relation to gray level; and a print engine rendering a halftoned image by printing halftone dots having pixels darkened in accordance with their threshold values to represent the appropriate gray scale level of the contone image.

19. The printing device of claim 18 wherein the parametrically controlled hexagonal dot shape function is $$Q_1 = a_1 \cos(\pi(2h_1/H_1)) + a_2 \cos(\pi(2h_2/H_2)) + a_3 \cos(\pi(2h_3/H_3))$$

where $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a respective one of the parallel lines from each set, and $a_1$ $a_2$ and $a_3$ are weight parameters controlling the rate at which a respective vertex of a halftone dot approaches a vertex of a neighboring halftone dot in relation to gray level, the halftone dots being substantially circular in halftoned image highlights having lower gray levels, substantially hexagonal in halftoned image midtones, and having triangular holes between adjacent dots in halftoned image shadows having higher gray levels.

20. The printing device of claim 18 wherein the parametrically controlled hexagonal dot shape function is $$Q_2 = a_1 \cos(\pi(2h_1/H_1)^{\gamma_1}) + a_2 \cos(\pi(2h_2/H_2)^{\gamma_2}) + a_3 \cos(\pi(2h_3/H_3)^{\gamma_3})$$

where $\gamma_i$ controls the shape of the sides of the halftone dots, $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a closest respective one of the parallel lines from each set, and $a_1$ $a_2$ and $a_3$ are weight parameters controlling the rate at which a respective vertex of a halftone dot approaches a vertex of a neighboring halftone dot in relation to gray level, the halftone dots being substantially circular in halftoned image highlights having lower gray levels, substantially hexagonal in halftoned image midtones, and having triangular holes between adjacent dots in halftoned image shadows having higher gray levels.

21. The printing device of claim 20 wherein $\gamma_i$ is greater than 1 producing halftone screen output resulting in printed hexagonal dots having concave-shaped sides, thereby producing sharper touch points with adjacent halftone dots, or n is less than 1 producing halftone screen output resulting in printed hexagonal dots having convex-shaped sides.

22. The printing device of claim 20 performing dot shape function rotation independently of halftone screen geometry by defining the halftone screen geometry using coordinates (x, y) and using (x', y') in $Q_2$ where:

$$x' = x \cos(\theta) - y \sin(\theta)$$

$$y' = x \sin(\theta) + y \cos(\theta)$$

and θ is the rotation angle between the dot and the screen orientation.

23. The printing device of claim 18 wherein the parametrically controlled hexagonal dot shape function is:

$$Q_3 = (a_1 + a_2 + a_3) - (a_1 \cos(\pi(2h_1/H_1)^{\gamma_1}) + a_2 \cos(\pi(2h_2/H_2)^{\gamma_2}) + a_3 \cos(\pi(2h_3/H_3)^{\gamma_3}))$$

where $\gamma_i$ controls the shape of the sides of the halftone dots, $H_1$, $H_2$ and $H_3$ are the periods of respective sets of parallel lines intersecting to define a hexagonal halftone screen lattice, $h_1$, $h_2$ and $h_3$ are perpendicular distances from a point of interest in the image to a closest respective one of the parallel lines from each set, and $a_1$ $a_2$ and $a_3$ are weight parameters controlling the rate at which a respective vertex of a halftone dot approaches a vertex of a neighboring halftone dot in relation to gray level, providing a compact growth sequence from dark triangles at lower gray levels, to dark hexagons as midtones, to light round holes between adjacent dots in the darker or higher gray levels.

* * * * *